United States Patent [19]

Curran

[11] Patent Number: 4,923,428
[45] Date of Patent: May 8, 1990

[54] INTERACTIVE TALKING TOY

[75] Inventor: Kenneth J. Curran, Thousand Oaks, Calif.

[73] Assignee: Cal R & D, Inc., Culver City, Calif.

[21] Appl. No.: 190,574

[22] Filed: May 5, 1988

[51] Int. Cl.$^5$ .................. A63H 30/00; A63H 3/28; A63H 3/20; A63H 13/00

[52] U.S. Cl. .................. 446/175; 446/299; 446/330; 446/354; 434/319

[58] Field of Search .......... 446/297, 298, 299, 300, 446/301, 330, 337, 338, 342, 352, 353, 354, 484, 175; 434/319

[56] References Cited

U.S. PATENT DOCUMENTS

| | | | |
|---|---|---|---|
| 3,199,248 | 8/1965 | Suzuki | 446/299 |
| 3,755,960 | 9/1973 | Tepper et al. | 446/299 |
| 3,912,694 | 10/1975 | Chiappe et al. | 446/354 X |
| 4,078,316 | 3/1978 | Freeman | 434/319 |
| 4,221,927 | 9/1980 | Dankman et al. | 446/175 X |
| 4,249,338 | 2/1981 | Wexler | 446/297 X |
| 4,445,189 | 4/1984 | Hyatt | 446/484 X |
| 4,654,659 | 3/1987 | Kubo | 446/299 X |
| 4,660,033 | 4/1987 | Brandt | 446/299 X |
| 4,696,653 | 9/1987 | McKeefery | 446/175 |
| 4,717,364 | 1/1988 | Furukawa | 446/354 X |
| 4,809,335 | 2/1989 | Rumsey | 446/175 X |
| 4,840,602 | 6/1989 | Rose | 446/175 |

FOREIGN PATENT DOCUMENTS

| | | | |
|---|---|---|---|
| 0032843 | 7/1981 | European Pat. Off. | 446/301 |
| 0036797 | 9/1981 | European Pat. Off. | 446/299 |
| 2191916 | 12/1987 | United Kingdom | 446/297 |

Primary Examiner—Robert A. Hafer
Assistant Examiner—D. Neal Muir
Attorney, Agent, or Firm—Price, Gess & Ubell

[57] ABSTRACT

An interactive, articulated talking toy talks and moves certain of its body parts (eyes, mouth, head and arms) under microprocessor control on the basis of the program material selected from a tape storage device incorporated in the body of the toy. The material selected is determined by a human's response to questions asked by the toy. The material stored on tape contains both audio and data. The processor chooses a particular one of a possible three audio tracks stored on tape on the basis of the specific response or nonresponse made by a human. The data track provides data to the processor which causes it to control the toy's body parts in concert with the audio program being reproduced. The toy has limited word recognition capabilities. The result is the appearance of interaction between the toy and a human by the toy's movement of its body parts and its speech seeming to respond to the human's input.

19 Claims, 12 Drawing Sheets

| $D_{0,2,4}$ | $D_{1,3,5}$ | |
|---|---|---|
| 0 | 0 | MOUTH CLOSED |
| 0 | 1 | REVERSE (BLINK) |
| 1 | 0 | ON (MOUTH AND EYES) |
| 1 | 1 | OFF |

FIG. 12

| $D_6$ | $D_7$ | |
|---|---|---|
| 0 | 1 | TRACK 1 COMMAND |
| 1 | 0 | TRACK 2 COMMAND |
| 1 | 1 | TRACK 3 COMMAND |

| $D_5$ | $D_6$ | $D_7$ | |
|---|---|---|---|
| 0 | 0 | 0 | LEFT ARM |
| 1 | 0 | 0 | RIGHT ARM |
| 0 | 1 | 0 | HEAD |
| 1 | 1 | 0 | LOAD SPEECH DATA |
| 0 | 0 | 1 | SET BRANCH REGISTER |
| 1 | 0 | 1 | SET RESPONSE REGISTER |
| 0 | 1 | 1 | TRACK EXECUTE |
| 1 | 1 | 1 | EXECUTE |

FIG. 15

| $D_0$ | $D_1$ | $D_2$ | $D_3$ | $D_4$ | |
|---|---|---|---|---|---|
| X | X | X | X | 0 | NORMAL BRANCH |
| X | X | X | X | 1 | DIRECT BRANCH |
| 0 | 0 | 0 | 0 | X | 1 to 1, 2 to 2, 3 to 3 |
| 0 | 0 | 0 | 1 | X | 1 to 1, 2 to 3, 3 to 2 |
| 0 | 0 | 1 | 0 | X | 1 to 2, 2 to 1, 3 to 3 |
| 0 | 0 | 1 | 1 | X | 1 to 2, 2 to 3, 3 to 1 |
| 0 | 1 | 0 | 0 | X | 1 to 3, 2 to 2, 3 to 1 |
| 0 | 1 | 0 | 1 | X | 1 to 3, 2 to 1, 3 to 2 |

| | $D_0$ | $D_1$ | $D_2$ | $D_3$ | $D_4$ |
|---|---|---|---|---|---|
| RANDOM RESPONSE — NO RESPONSE | O | O | X | X | X |
| PLAY TRACK 1 — NO RESPONSE | O | — | X | X | X |
| PLAY TRACK 2 — NO RESPONSE | — | O | X | X | X |
| PLAY TRACK 3 — NO RESPONSE | — | — | X | X | X |
| RANDOM RESPONSE — NOT SURE | X | X | O | O | X |
| PLAY TRACK 1 — NOT SURE | X | X | O | — | X |
| PLAY TRACK 2 — NOT SURE | X | X | — | O | X |
| PLAY TRACK 3 — NOT SURE | X | X | — | — | X |

FIG. 16

| $D_0$ | $D_1$ | $D_2$ | $D_3$ | $D_4$ | |
|---|---|---|---|---|---|
| 0 | 0 | 0 | 0 | 1 | INCREMENT SELECTION PERIOD |
| 0 | 0 | 0 | 1 | 0 | GO TO TRACK 1 |
| 0 | 0 | 0 | 1 | 1 | GO TO TRACK 2 |
| 0 | 0 | 1 | 0 | 0 | GO TO TRACK 3 |
| 0 | 0 | 1 | 0 | 1 | RESET |
| 0 | 0 | 1 | 1 | 0 | SET POP MODE |
| 0 | 1 | 0 | 0 | 0 | REWIND TO BEGINING |
| 1 | 0 | 0 | 0 | 0 | BEGIN TRACK BRANCH |
| 1 | 0 | 0 | 1 | 0 | BEGIN TRACK BRANCH No. 2 |
| 1 | 0 | 1 | 0 | 0 | BEGIN SEQ. BRANCH |
| 1 | 0 | 1 | 1 | 0 | BEGIN SEQ. BRANCH No. 2 |
| 1 | 1 | 1 | 1 | 1 | NO OP |

INTERACTIVE TALKING TOY

BACKGROUND OF THE INVENTION

1. Field of the Invention

The present invention relates generally to improvements in articulated talking toys, and more particularly, pertains to new and improved interactive systems wherein the appearance of a conversation between the toy and a child is created.

2. Description of the Prior Art

Those concerned with the development of articulated talking toys have long recognized the desirability of creating a toy that simulates interaction with the child by appearing to respond to promoted input from the child. Such interaction has heretofore been unattainable because of the problems associated with implementing the audio and control storage and processor requirements. The equipment to perform these functions could not be satisfactorily incorporated into the articulated talking toy. At best, umbilical cord arrangements were contrived.

SUMMARY OF THE INVENTION

The speech and movement of body parts of the toy are controlled by multiple audio tracks and a single data track on a multiple track tape. The particular audio track reproduced at any time is directed by a processor on the basis of a response by a human. The response could be by voice or other input mechanism. The data for controlling the moving parts of the toy are stored in analog form. This data directs the processor to move certain of the toy's body parts to simulate animation that is synchronized with the toy's audio output. A variety of program branching schemes are utilized in order to simulate the toy's comprehension of the human response on a continuous basis throughout the tape defined programs.

BRIEF DESCRIPTION OF THE DRAWINGS

The objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figure 1:
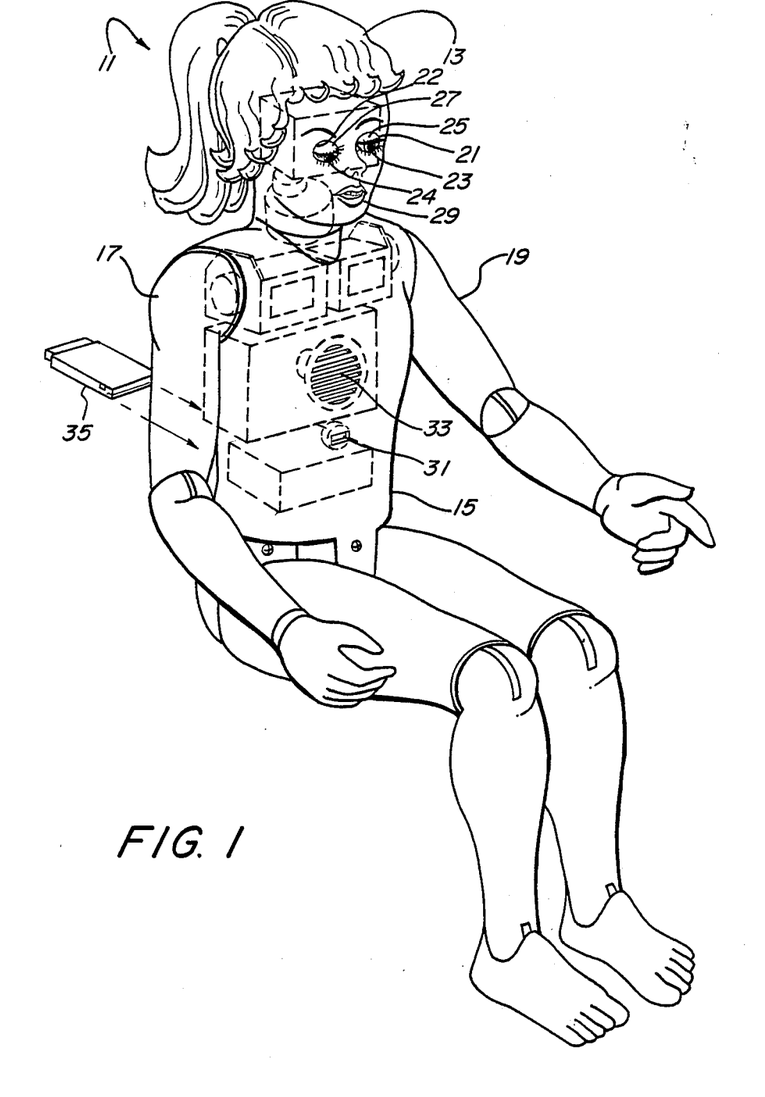
FIG. 1 shows a front body perspective of an articulated toy according to the present invention.

The articulated talking toy mechanism 11 of the present invention is shown embodied in a doll 11. The doll has a body 15 to which a head 13, a left arm 19 and a right arm 17 are attached. The head includes a pair of eyes 21 and 22 which have a pair of moving eyeballs 23 and 24, and a pair of moving eyelids 25 and 27, respectively. The head 13 also has a mouth 29 which opens and closes.

Contained in the body 15 of the doll is the electronic processor and the audio reproduction system that makes the doll 11 interactive with the child. A small microphone 31 and a speaker 33 are mounted in the breast of the doll.

The audio programs that emanate from the speaker 33 of the doll are stored on a cassette mechanism 35 (FIG. 2) which fits into a slot 16 at the back of the doll's body 15. The cassette 35 may be of the type illustrated and claimed in co-pending patent application U.S. Serial No. 149,422, entitled "Magnetic Tape Transport System," which is assigned to the same assignee as the present application. To the extent the subject matter of U.S. Serial No. 149,422 needs to be referred to in order to understand the present application, that subject matter is incorporated herein by reference.

Figure 3:
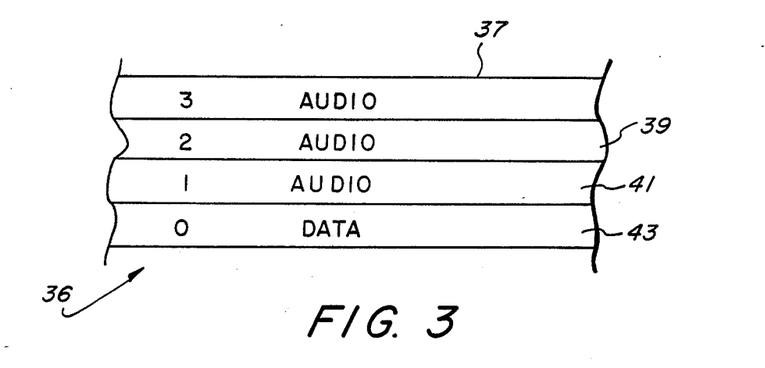
FIG. 3 is a schematic illustration of the recording tracks on the tape cassette used in the present invention.

The tape 36 actually contained within the cartridge 35 preferably contains four parallel tracks of recorded information. The zero track 43 is preferably reserved for data. The remaining tracks, 1, track 41, 2, track 39, and 3, track 37, each contain audio signals representing various audio program material that can be fed to the speaker 33 in the doll's breast. The audio program material fed to the speaker 33 of the doll consists of the speech and music.

Figure 2:
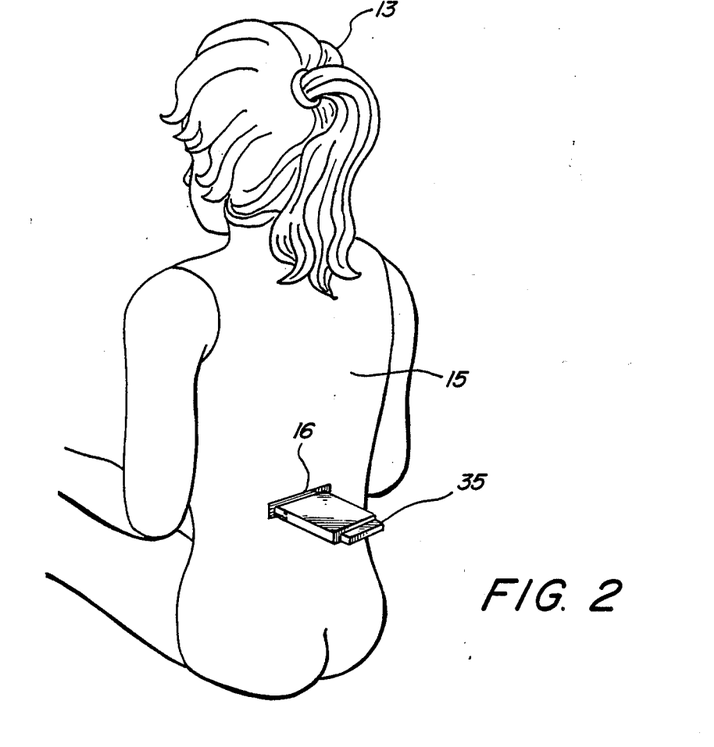
FIG. 2 is a back body perspective of an articulated toy according to the present invention.

The doll 11 has articulated body parts which are driven by servo motors. The left and right arms 19 and 17 of the doll can move at the shoulder. The head 13 of the doll can move left to right. The mouth 29 of the doll moves open and closed. The eyes of the doll move to the extent that the eyeballs 23, 24 move back and forth and the eyelids 25, 27 blink periodically.

Referring first to a more detailed discussion of the audio program reproduction system of the articulated toy (FIG. 4), information stored on the four tracks 37, 39, 41 and 43 of the tape 36 are reproduced by reproducing heads 45, 47, 49, and 51, respectively.

Figure 4:
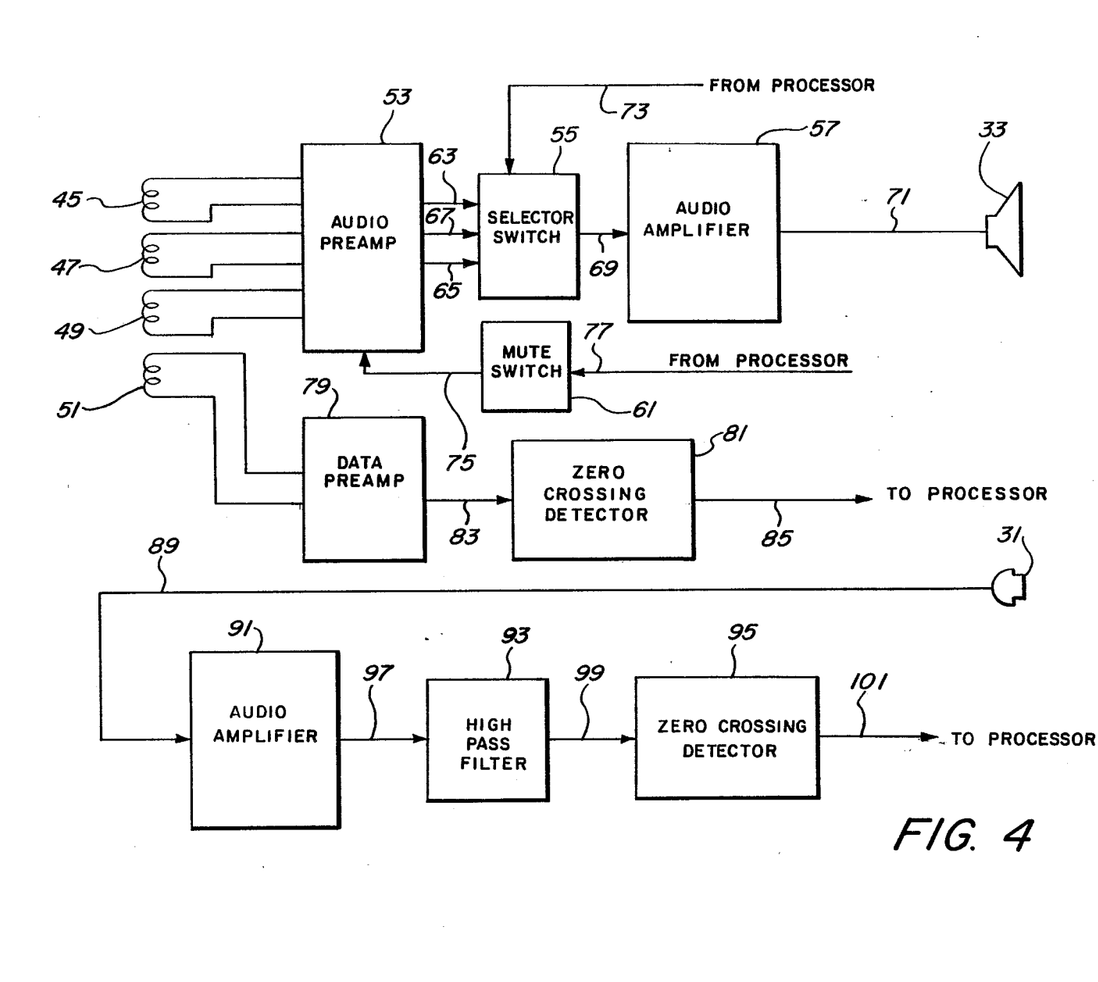
FIG. 4 is a block diagram showing the audio electronic circuitry located in the articulated talking toy.
Figure 5:
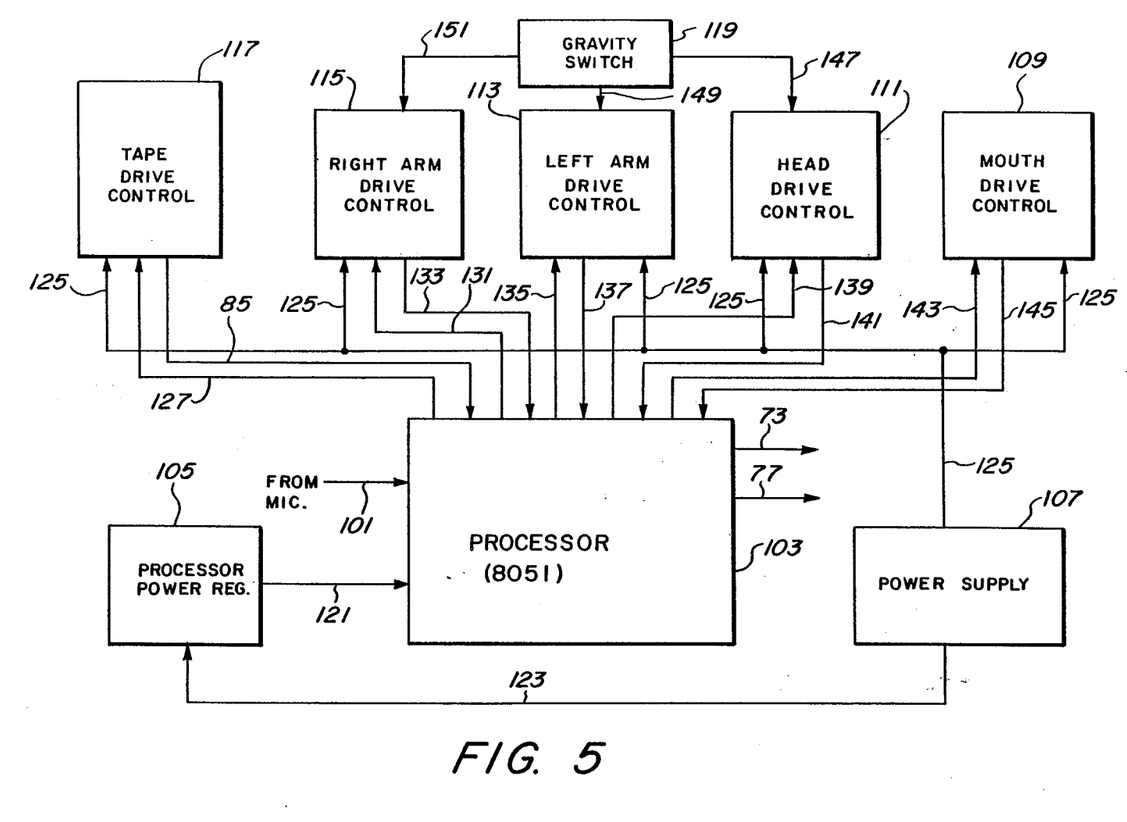
FIG. 5 is a block diagram of the processor and servo systems located in the articulated toy.

Reproducing head 51 reproduces the analog signal recorded on data track 43 and supplies it to a data pre-amplifier 79 which in turn supplies the amplified analog signal over lines 83 to a zero crossing detector 81. The zero crossing detector 81 simply detects and indicates the positive and negative zero crossings occurring in the analog signal supplied to it. These indications are provided over line 85 to a processor 103 (FIG. 5). The processor 103 determines, on the basis of the zero crossings, whether the data recorded was a digital "zero" or digital "one" in a manner that will be hereinafter described.

The three audio reproduction heads 45, 47 and 49 continuously read the analog information recorded on the audio tracks 37, 39 and 41. The reproduced signals from these heads are provided to an audio pre-amp 53, which may be three individual audio amplifiers, one for each reproduction head, or simply a three-channel audio pre-amp. The audio pre-amp 53 supplies the amplified signal from each of the heads to an audio amplifier 57 through a selector switch 55.

The reproduced signal from head 45 is supplied by line 63 to selector switch 55. The reproduced signal from head 47 is supplied over line 67 to selector switch 55. The reproduced signal from head 49 is supplied to switch 55 over line 65.

The selector switch 55 is controlled over line 73 by an output from the processor 103 (FIG. 5). Processor 103 determines which one of the three input signals on line 63, 67 and 65 are to be at that moment supplied to audio amplifier 56 over line 69. The signal supplied to audio amplifier 57 is amplified to a listening level and supplied over line 71 to speaker 33.

In order to prevent unpleasant noises in the audio reproduction chain, such as clicking sounds, when the selector switch 55 is changing from one input to another, processor 103 also provides a signal on line 77 to a mute switch 61. Mute switch 61 directs the audio pre-amp 53 over line 75 to turn off just before selector switch 55 makes a selection and turn back on immediately after the selection is made.

FIG. 4 also illustrates the preferred circuitry utilized to provide input from a child in verbal form by speaking into microphone 31. The signals generated by microphone 31 are supplied over lines 89 to audio amplifier 91 which amplifies the received signals and supplies them over lines 97 to a high-pass filter 93 which reduces the low frequency signals, thereby emphasizing the high frequency content of the speech signal received. The filtered speech signal is then supplied over lines 99 to a zero crossing detector 95 which detects all positive and negative going zero crossings of the analog signal, providing on line 101 an indication thereof to the processor 103 (FIG. 5).

Processor 103 utilizes the zero crossing information to identify the word spoken by the child. The child's response is then utilized to direct the audio program and animation of the doll to seemingly respond.

The specific manner in which the processor accomplishes this word recognition is fully described and claimed in co-pending patent application, U.S. Serial No. 190,665, entitled "Task Oriented Speech Recognition System," assigned to the same assignee as this application. To the extent that the information contained in U.S. Serial No. 190,665 is necessary for the understanding of the present invention, that information is incorporated herein by reference.

It should also be recognized that rather than utilizing a word recognition system as the means by which a child may provide input to the animated interactive talking toy, nonverbal input systems may be utilized as well. Examples of such input systems are key pad input mechanisms (not shown), which are well-known in the art. Examples of other limited word recognition systems that may be utilized rather than the particular system described and claimed in co-pending application U.S. Serial No. 190,665 can be found in U.S. Pat. No. 4,569,026, issued on Feb. 4, 1986, to Robert M. Best for "TV Movies That Talk Back."

Referring now to FIG. 5, the processor 103 utilized is preferably an INTEL 8051 microprocessor with 4 K-bytes of ROM and 128 bytes of RAM Processor 103 is supplied with power from a power regulator 105 which supplies regulated power over line 121. Power regulator 105 also advises the processor whenever the power supply for the system, power supply 107, drops below a predetermined value. Power supply 107 supplies power to the power regulator circuit 105 over lines 123. Power supply 107 is preferably a plurality of batteries sufficient in combination to supply the power necessary to drive processor 103 as well as the servo motors for the mouth, head, left arm, right arm and the tape drive motor.

Power supply 107 supplies power to the servo motor 109 for driving the mouth mechanism over line 125. The servo motor 111 for driving the head mechanism, the servo motor 113 for driving the left arm mechanism, and the servo motor 115 for driving the right arm mechanism, are all powered by power supply 107 over line 125. Power supply 107 also powers tape drive motor 117.

The tape drive mechanism 117 preferably utilized is the tape drive disclosed in co-pending U.S. Pat. Application Serial No. 149,422, assigned to the same assignee as the present application. To the extent that the disclosure in that application is necessary for the understanding of the present invention, the subject matter thereof is incorporated herein by reference. The tape drive 117 effectively has only four electronically controlled functions, pause, play, fast-forward, and rewind.

Processor 103 controls the tape drive by commands issued to the tape drive over lines 127. The data read from the data track, which is preconditioned after recovery from the tape, as described in connection with FIG. 4 above, is transmitted in the form of digital information to the processor 103. The particular operation of processor 103, in response to the data received, will be described more fully hereinafter. For the present, it is sufficient to know that the data directs the processor 103 in the manner it controls the articulated parts of the interactive talking doll, such as the mouth, head, left arm, right arm and eyebrows.

The mechanism of the present invention includes a gravity switch 119 which is situated in the articulated talking toy 11 in a manner that detects when the toy is lying down. Upon the doll being placed in a prone position, gravity switch 119 inactivates right arm drive control 115 over lines 151, left arm drive control 113 over lines 149, and head drive control 111 over line 147. The gravity switch 119 does not affect the operation of the mouth drive control 109, thereby allowing the doll to continue to talk while lying down. However, it does not move its head or arms.

Processor 103 controls the mouth drive control circuit 109 by signals sent to it over cable 143 under control of data received from tape drive 117 over line 85, and information received from the mouth drive circuit over line 145. The mouth drive control system 109 that is preferably utilized in the present invention is disclosed in co-pending patent application U.S. Serial No. 149,712, entitled "Mechanism For Animating A Doll's Facial Features," and assigned to the present assignee. To the extent that the disclosure in that application is necessary for the understanding of the present invention, the subject matter thereof is incorporated herein by reference. This application discloses a mouth, eyes and eyebrow driving circuit which is all under the control of a single drive motor. The eyebrows are caused to blink seemingly randomly and intermittently by reversing the motor.

Processor 103 controls the motor drive for the mouth, eyes and eyebrows by controlling mouth drive control 109 in a manner that is synchronized with the audio signals being supplied to the speaker by tape drive 117 under control of the data being supplied by the tape drive over line 85 to processor 103. In the same manner, the data signals supplied to processor 103 from the tape drive control the right arm drive, the left arm drive, and the head drive. The result is, the right arm moves up or down, the left moves up or down, and the head moves right or left, somewhat in relation to the audio signals being supplied to the speaker of the talking toy, making it appear that the toy is actually talking.

Processor 103 supplies control signals over line 131 to right arm drive 115 and receives position indications on line 133 from the right arm drive. In the same manner, processor 103 controls the position of the left arm by providing control signals to left arm drive 113, which in turn, supplies position signals on line 37 to processor 103. Processor 103 also provides drive control signals over line 139 to head drive 111, which in turn provides position signals to processor 103. Processor 103 continuously, as will be explained hereinafter, updates the positions of the right arm, left arm, head, and mouth, as commanded by the data received over line 85 from the tape unit 117.

Processor 103 utilizes the data received over line 85 to create the branching required for the toy to present a responsive audio program. Processor 103 provides the branching required by way of the signals it generates on output line 73 which is connected to selector switch 55 (FIG. 4). As already explained, this selects one of the three audio tracks to be reproduced at speaker 33. Output signals on line 77 are supplied to mute switch 61 so that no clicking or popping sounds occur as a result of the selection between audio tracks. The processor 103 generates the signals, not only in response to data received from the tape over line 85, but also from consideration of the input received on line 101 from the child. This input may be in verbal form or key pad form as already described.

Figure 6:
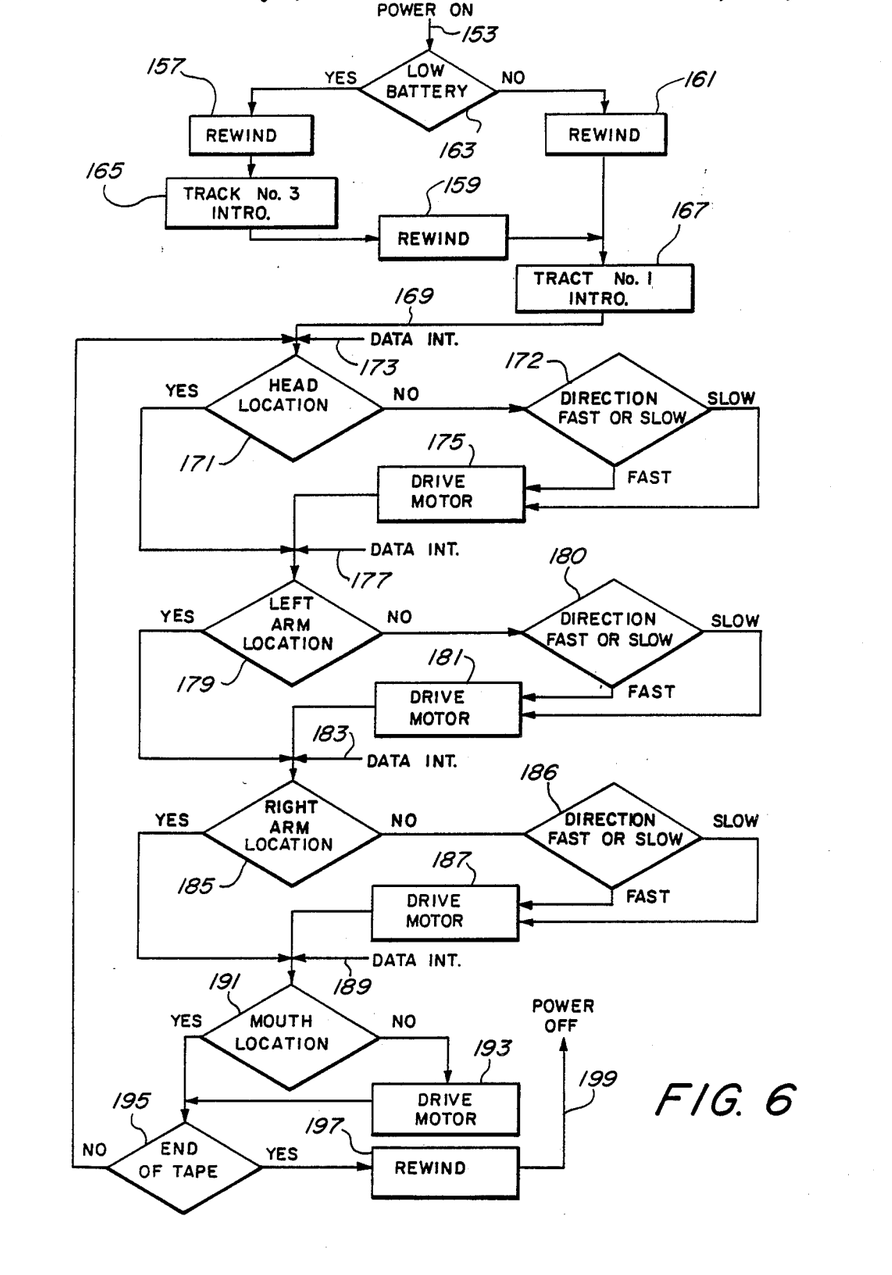
FIG. 6 is a flow chart showing the main operating loop of the processor of FIG. 5.

The processor 103 controls the movement of the body parts by a continuous main loop, as shown in FIG. 6. Data necessary to perform the operations is supplied on an interrupt basis to the main loop. The essential function of the main loop is to operate the articulated parts of the toy, the head, left arm, right arm, and the mouth. The main loop (FIG. 6) shown starting at input 169 and ends at mouth location decision 191. Data interrupts can occur at any spot along this main loop, at a spot before the head location decision 173, at a spot before the left arm location 177, at a spot before the right arm location 183, and at a spot before the mouth location decision 191.

The whole sequence is started when power 153 is turned on at the time the cassette is inserted into the tape drive mechanism. The microprocessor first checks to see if a low battery condition 163 exists. If the decision 163 is "no," then it rewinds the tape 161 to the beginning of any one of a number of specific starting points so that all data for the next bunch will be available. Then it starts to play and proceeds to input 169 at the head location decision 171.

If the low battery decision 163 is "yes" meaning battery power is insufficient, the tape is rewound 157 to an introductory statement 165 on track No. 3. This introductory statement may come out of the speaker in the following form:

"Hi, I'm Jill, I'm tired today. I think I need a new set of batteries."

After this statement is played, the tape will rewind after 159 to play the normal opening. If the low battery decision 163 determines that the batteries are sufficient, an introductory statement 167 for the program on track 1 may be selected. This may cause the following to emanate from the speaker in the articulated toy:

"Hi, I'm Jill, what's your name?" (Pause) "I see you want to talk about (name of tape). Here's how we're going to play. I'll ask you some questions, and give you some choices and you tell me what you want. If you don't pick one, then I will. We can talk about school, or exercise, or about my summer vacation. Which one do you want to talk about? School, exercise, or vacation?" (Pause for response)

At the same time, either the track 3 introduction 165 or the track 1 introduction 167 is coming from the speaker, the arms, head and mouth of the doll are moving as directed by the processor according to the main processing loop as shown in FIG. 6. The processor first interrogates whether the head is located at the location required as per the last data input. If the head location decision 171 is "no," then the decision 172 as to the direction and whether movement is to be fast or slow is made. With these decisions made, the drive motor 175 is told to move the head in one direction or the other and how fast. A fast command simply means that the motor drives at a 100% duty cycle. A slow command simply means that the motor is actually driving at 50% duty cycle. After these decisions are made the motor is turned on, and the processor goes to the next check. If the head location decision 171 happens to be "yes," the processor goes to the next check.

At the next check, a left arm location decision 179 is made. If the left arm is in the appropriate location as indicated by data received earlier during an interrupt cycle, the processor 103 proceeds to make a right arm location decision 185. If the left arm is not in the appropriate location, the process proceeds to make a direction and fast or slow decision 180, and turns the motor on. It then proceeds to the next check, the right arm location.

The right arm location decision 185 is similar to the process described for the left arm location decision. If the right arm is not in the appropriate location, a direction and fast or slow decision 186 is made and actuates the drive motor 187 to move the arm accordingly and then move on to the next check. If the right arm is in the appropriate location, the process moves on to the next check, the mouth location.

The mouth location decision 191 determines if the mouth is in the appropriate location as dictated by data received by the processor during the last interrupt. The drive motor 193 is instructed to move it if it is not. It then goes to the end of tape check 195. If it is in the right location, the processor 103 goes to the end of tape check 195. The processor loop thus can have all servos operating at the same time.

Figure 7:
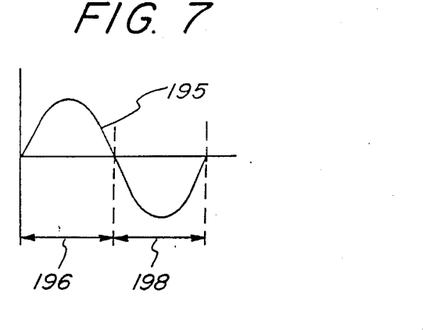
FIG. 7 is a waveform illustrating data recorded on the magnetic tape.
Figure 8:
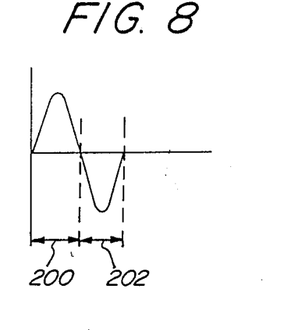
FIG. 8 is an alternate waveform illustrating data recorded on the magnetic tape.

If the end of tape has not been reached, the processor goes back to the beginning of the main loop to the head check 171. If the end of tape has been reached, the processor proceeds to instruct the tape mechanism to rewind 197 and then turn the power off. The data being received during interrupts to the main loop is received from the data channel recorded on the tape in the cassette recorder (FIGS. 4 and 5). The data recorded on the data channel is serial and consists of frequency modulated tones representing a serial bit stream. A data bit "one" is represented by a single sine wave 197 of 2 khz. This is illustrated in FIG. 8. A data bit "zero" is represented by a single sine wave 195 of 1 khz (FIG. 7) As can be seen from these figures:, a binary zero is represented by a period 196, 197 of 0.5 ms between crossings, while a binary one is represented by a period 200, 202 of 0.25 ms between crossings.

Figure 9:
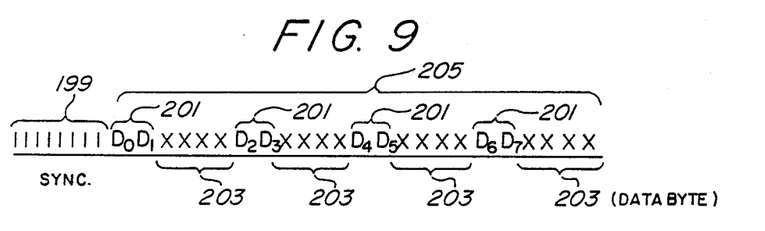
FIG. 9 illustrates the structure of a data word recorded on the magnetic tape.

FIG. 9 illustrates a 32-bit string that constitutes a data field. The data field is structured into an 8-bit sync byte 199 and a 24-bit data and parity field 205. The 8-bit sync 199 is all binary ones. The 24-bit data field consists of four 4-bit data bytes 203 and four 2-bit parity bytes 201 interspersed between each data byte.

In addition, pauses are placed on the tape to mark data blocks. These pauses serve to mark points on the tape for fast-forward or rewind functions. There are two types of pauses. A one-second pause at 0 hz used to mark a position for rewind and a 500 ms pause at 250 hz used to mark a point for fast-forward.

Figure 10:
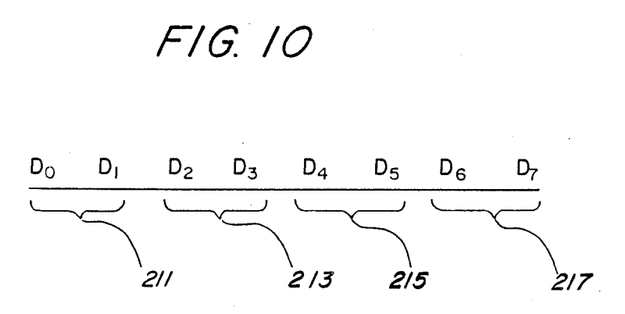
FIG. 10 illustrates the structure of a byte in the data word of FIG. 9.

The data and parity field 205 directs the processor with respect to the doll's articulated parts by the interaction of the control byte 201 and the data byte 203. The control byte shown in FIG. 10 is divided into four 2-bit signals. The first three define eye-mouth movement based on the currently selected track. The $D_0 D_1$ pair 211 always defines eye-mouth movement when audio track one is being played. The $D_2 D_3$ position bit pair 213 always defines eye, mouth movement when track two audio is being played. The $D_4 D_5$ bit position 215 always defines eye-mouth movement when the track three audio is being played. $D_6 D_7$ bit positions 217 define the track number of the control byte which follows.

Figure 11:
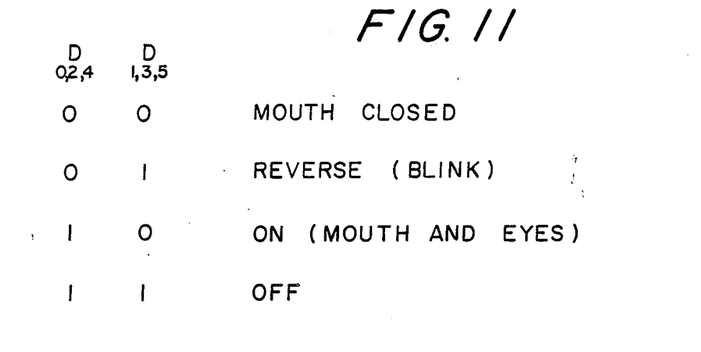
FIG. 11 illustrates the code applicable to the data byte of FIG. 10.

The coding for the eye-mouth movement is illustrated in FIG. 11 for bit pairs $D_0 D_1$, $D_2 D_3$, and $D_4 D_5$ for tracks 1, 2, and 3, respectively. If the bit pair as illustrated is two binary zeros, this indicates that the mouth must be closed at this time. If the bit pair is a binary zero, binary one, as illustrated, a motor reversal is indicated causing an eye blink. If the bit pair is a binary one, binary zero, as indicated, then the mouth motor is on. If the bit pair is two binary ones, the mouth motor is off.

Figure 12:
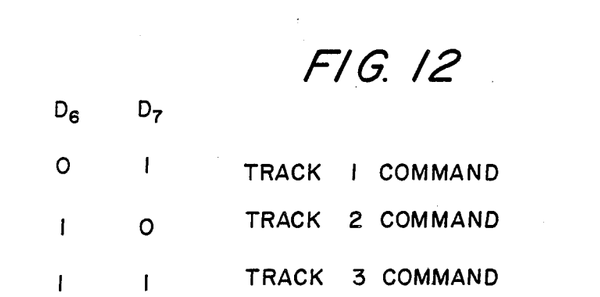
FIG. 12 illustrates the code applicable to the data byte of FIG. 10.

Bits $D_6 D_7$ are coded as indicated in FIG. 12. When the bit pair is binary zero, binary one as shown, the indication is that the track number of the control byte to follow is track 1. If it is binary one, binary zero as shown, this indicates that the track number of the control byte to follow is track 2. If it is a binary one, binary one as shown, this indicates that the track number of the control byte to follow is track 3.

Figure 13:
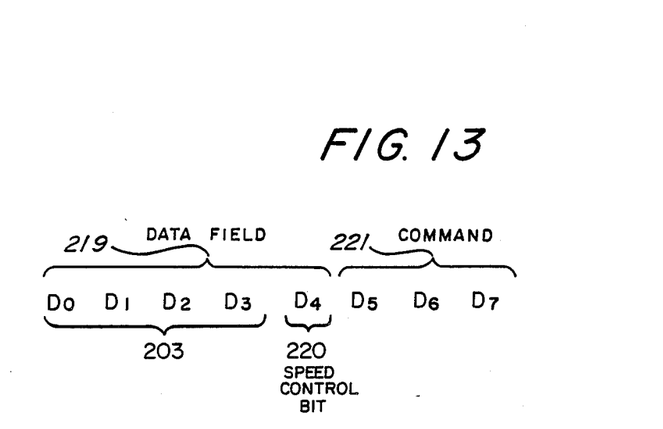
FIG. 13 illustrates the structure of a command byte in the data word of FIG. 9.
Figure 14:
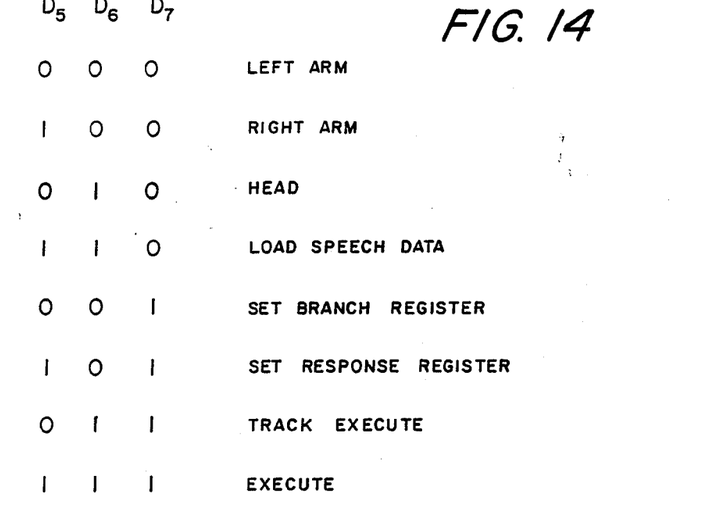
FIG. 14 illustrates the code applicable to a portion of the command byte of FIG. 13.

The command byte is structured as shown in FIG. 13. The command byte has a 3-bit command field 221 and a 5-bit data field 219. The data field is comprised of the data byte 203 and the speed control bit 220. The 3-bit command occupies bit positions $D_5$, $D_6$ and $D_7$. They are coded as indicated in FIG. 14 as follows. When bits $D_5$, $D_6$ and $D_7$ are all binary zeros, the command is to set the left arm position. When bits $D_5$, $D_6$ and $D_7$ are binary one, zero, zero, the command is to set the right arm position. When the bits $D_5$, $D_6$ and $D_7$ are binary zero, one, zero, the command is to set the head position. When bits $D_5$, $D_6$ and $D_7$ are binary one, one, zero, the command is to load speech data. This means that the data contained in the control byte is loaded into the processor random access memory.

The left arm, right arm and head position commands carry with it a data field which consists of a 4-bit position number, $D_0$, $D_1$, $D_2$ and $D_3$, and a 1-bit speed control flag $D_4$. These data fields define the movement of the arms and head.

Figure 15:
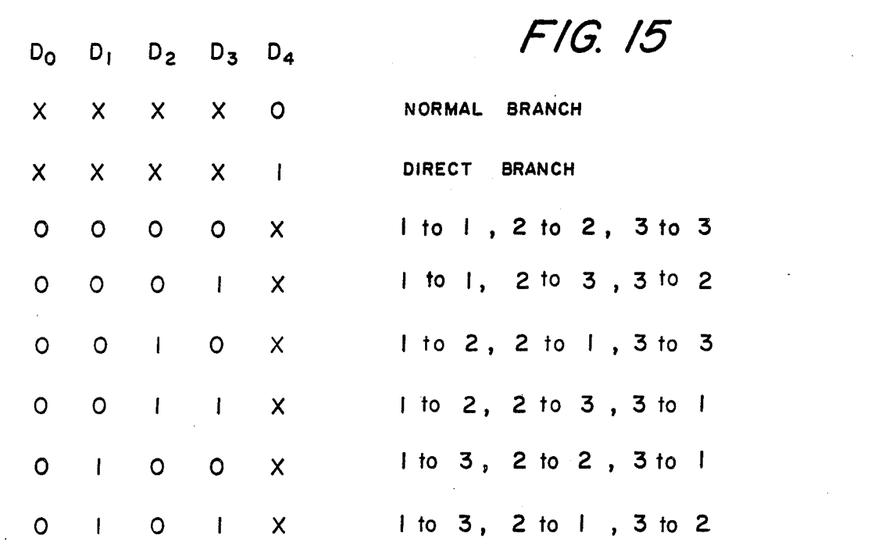
FIG. 15 illustrates the code applicable to a portion of the command byte of FIG. 13.

When the control bits $D_5$, $D_6$ and $D_7$ are binary zero, zero, one, the command is to set the branch register. This command defines how the next branch will be accomplished. The data field that is supplied in conjunction with this command, defines the type of branch and the branch routing connecting the choice number to a specific track. This coding scheme is illustrated in FIG. 15 and will be explained more fully hereinafter.

When command bits $D_5$, $D_6$ and $D_7$ are binary one, zero, one, the command is to set the response register. This command is used to set the desired response of the toy if no selection is made by the child or an unidentifiable response is made. The data field being provided with this command is used to define the type of branch. Essentially, the first two bits of the data field sets the no response function. This will be explained more fully in connection with FIG. 16, which illustrates the coding scheme therefore.

When commands bits $D_5$, $D_6$ and $D_7$ are coded binary zero, one, one, a track execute command is received by the processor. The track execute command affects real-time changes in the doll operation and are placed on the tape at the exact point that the function described in the data field is to take place. Track execute commands require that a match exist between the coded track number and the actual track being played.

If the $D_5$, $D_6$, and $D_7$ command bits are three binary ones, the processor receives an execute command. The execute command is not depended upon the track being played. It will cause whatever the data field describes to be executed upon receipt. These commands are placed on the tape at the exact point in the audio program the function described by the data field is to take place.

The command load speech data illustrated in FIG. 14 is utilized only when the child input device is a voice recognition unit. As noted earlier, the voice recognition that may be utilized in conjunction with the present system described herein is described and claimed in co-pending U.S. Pat. Application Serial No. 190,665, entitled "Task Oriented Speech Recognition System." To the extent that the description disclosed in co-pending U.S. Pat. Application Serial No. 190,665 is necessary the understanding of the present invention, the subject matter thereof is incorporated herein by reference.

Figure 18:
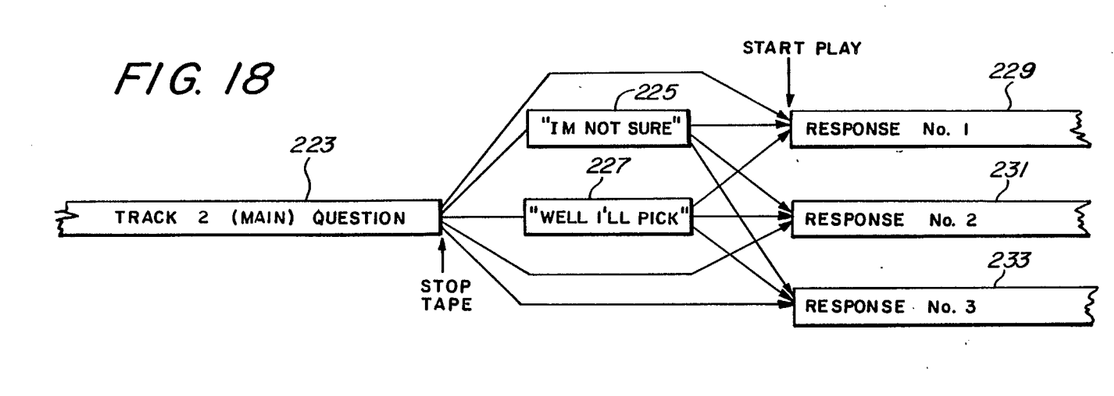
FIG. 18 illustrates a certain set of branching sequences that may be implemented by the processor of the system.
Figure 19:
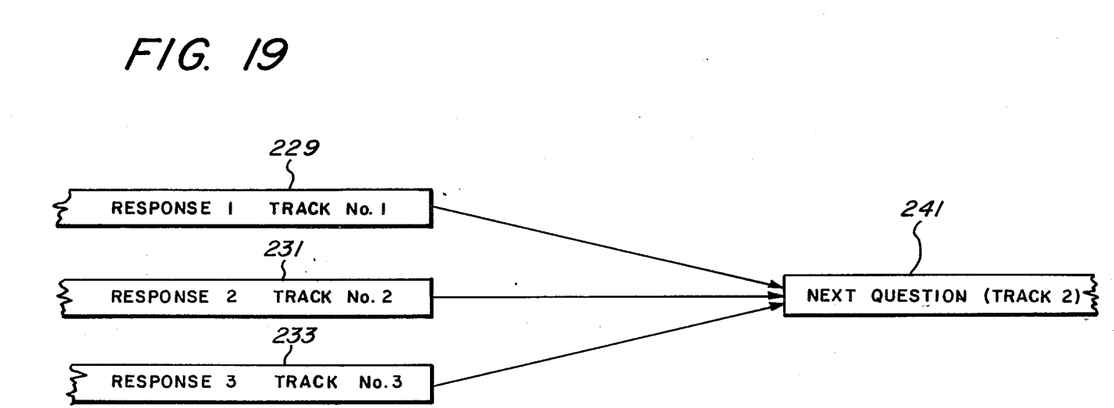
FIG. 19 illustrates an alternate set of branching sequences that may be implemented by the processor.

The command "set branch register," as noted earlier, defines how the next branch will be accomplished. The data field which is occupied by bits $D_0$ through $D_4$, defines the next branch in the manner illustrated in FIG. 15. The most significant bit position $D_4$ defines the type of branch to be accomplished. Thus, a binary zero defines a normal branch, for example, as shown in FIG. 18. Whereas a binary one in a $D_4$ position defines a direct branch, for example, as shown in FIG. 19.

The remainder of the field, bit positions $D_0$ through $D_3$, define the branch routing which connects the choice number to a specific track. The illustration of FIG. 15 assumes that the child is inputting one of three possible word choices.

As illustrated in FIG. 15, for a particular sequence having three choices, the data field of the command byte is four binary zeros in a $D_0$ through $D_3$ bit position. This indicates that if choice one was made then the track one response will be selected. If choice two was made, then the track 2 response will be selected, and if choice three was made, then the track 3 response will be selected. If the data field indicates three binary zeros and a binary one in a $D_3$ bit position, the first choice would cause the processor to select track 1, a second choice would cause the processor to select track 3, and a third choice would cause the processor to select track 2. If the data field of the command byte were binary zero, zero, one, zero, a first choice would cause the processor to choose track 2, a second choice would cause the processor to choose track 1, and a third choice would cause the processor to choose track 3. Likewise, a binary zero, zero, one, one data field would cause a first choice to select track 2, a second choice to select track 3, and a third choice to select track 1. A binary zero, one, zero, zero data field would cause a first choice to select track 3, a second choice to select track 2, and a third choice to select track 1. A binary zero, one, zero, one data field would cause a first choice to select track 3, a second choice to select track 1, and a third choice to select track 2. In this manner, as will be more fully described in connection with FIGS. 18 through 21, a large variety of branch sequence between the multiple audio tracks may be accomplished in response to the input from the child, thereby simulating interaction between the child and the toy.

In those situations where the mechanism is utilizing a verbal input voice recognition unit and the verbal input cannot be readily ascertained by the mechanism, the particular branching sequence to be followed is directed by the "set response register" command. The data field encoding that corresponds to such a command is the $D_0$ through $D_4$ data field illustrated in FIG. 16.

Figure 16:
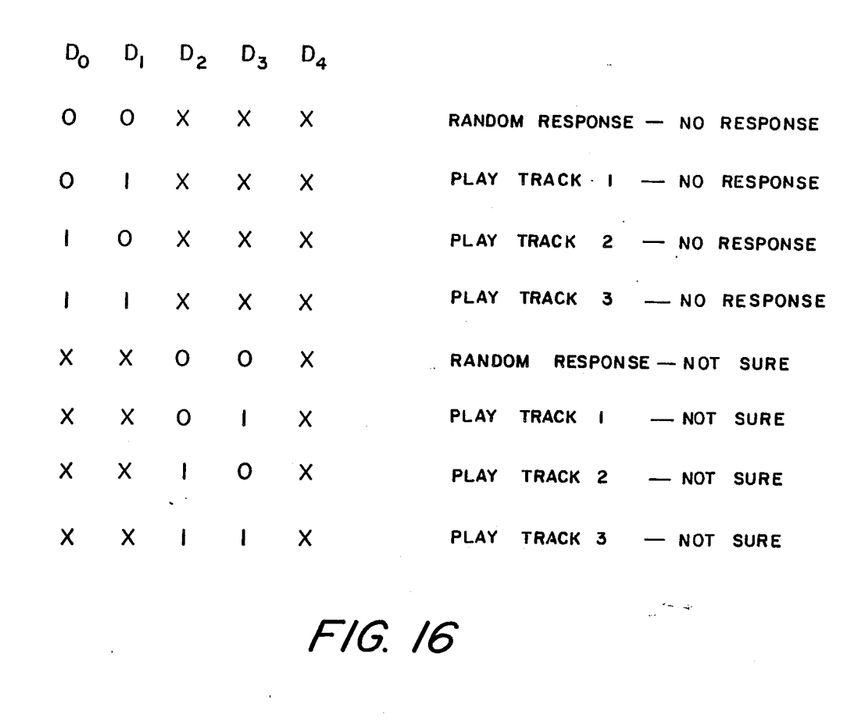
FIG. 16 illustrates the code applicable to a portion of the command byte of FIG. 13.

The first two bits in the field, $D_0$ and $D_1$ set the no response function. That is, when there is no response, the $D_0$ and $D_1$ bits determine which track to play in response. If the $D_0$ and $D_1$ bits are both binary zero, when a child gives no response to a question, a random response is provided. When the $D_0$ and $D_1$ bits are at binary zero, one, track 1 is played when there is no response. When the $D_0$ and $D_1$ bits are binary one, zero, track 2 is played when there is no response. If the $D_0$ and $D_1$ bits are binary one, one, track 3 is played when there is no response.

The next bit positions $D_2$ and $D_3$ set the not sure response selection. Thus, if $D_2$ and $D_3$ are two binary zeros, a random response is given when there is poor correlation between the response and the appropriate one of the three selections. If the $D_2$ and $D_3$ bits are binary zero, one, a poor correlation causes track 1 to play. If the $D_2$ and $D_3$ bits are binary one, zero, track 2 is played. If the $D_2$ and $D_3$ bits are binary one, one, track 3 is played.

Figure 17:
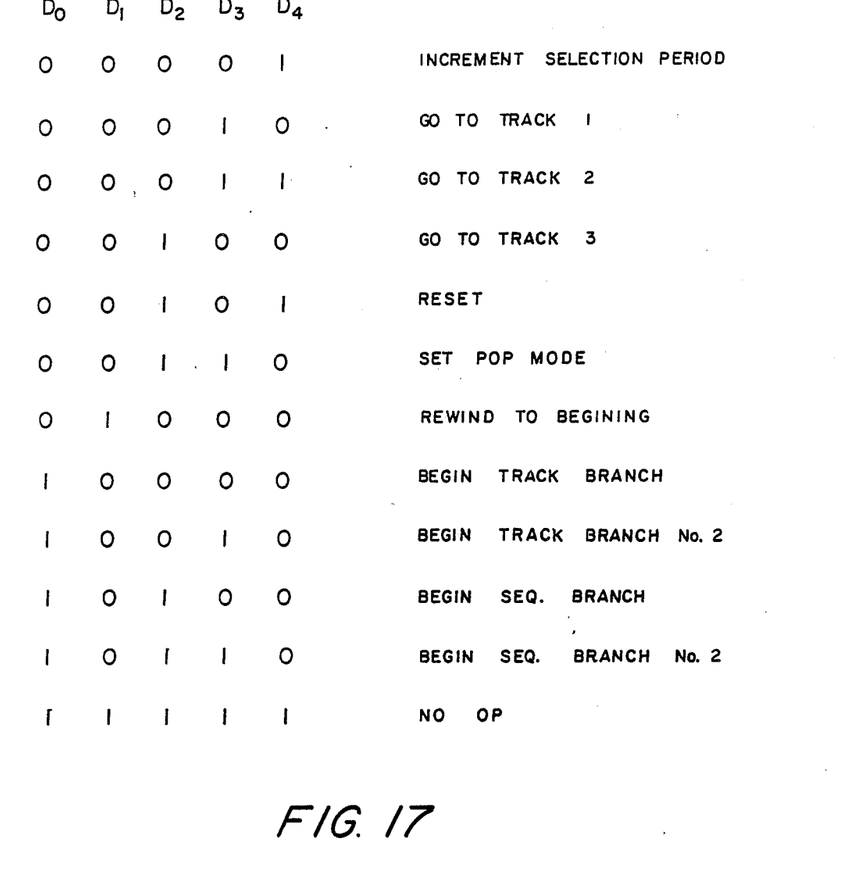
FIG. 17 illustrates the code applicable to a portion of the command byte of FIG. 13.

When the "track execute" or "execute commands" are provided to the processor, as set forth in FIG. 14, the data field that follows in bit positions $D_0$ through $D_4$, as noted earlier, describe the functions to be performed, at the exact time that the command is received. The coding for this data field is shown in FIG. 17.

If the data field in bit positions $D_0$ through $D_4$ is binary zero, zero, zero, zero, one, the selection period, which is normally five seconds, is incremented by one second. The selection period is the period of time which the toy waits for a response from the child to the toy's question. If the data field contains the binary bits zero, zero, zero, one, zero, the processor causes the tape reproduction unit to unconditionally change to track 1, if it is an execute command. If it is a track execute command, it will change to track 1 only if it is on a specifically designated track. With a data field of binary zero, zero, zero, one, one, the processor will select track 2 unconditionally or conditionally. A data field of binary zero, zero, one, zero, zero, will cause the processor to select track 3 unconditionally or conditionally, as described above. A data field of binary zero, zero, one, zero, one causes the tape to rewind to the beginning and continue in the play mode, essentially resetting the system. This function is performed to end the low battery sequence. If the data field is binary zero, zero, one, one, zero, the tape stops and will not begin again until a low battery condition is sensed. In other words, the 9-volt normal supply drops below 6.25 volts. If the data field is binary zero, one, zero, zero, zero, the tape rewinds to the beginning. If the data field is binary one, zero, zero, zero, zero, a track branch is started. Essentially the tape is stopped and the choosing period (five or more seconds) is started.

If the data field is binary one, zero, zero, one, zero, the branch at the end of the prephrased period is initiated, if the prephrases have been selected, these are the prephrases that are utilized when there is no response from the child or the word recognition system has not made a definitive selection as to the response. As an example, the prephrases that could be utilized would be "I'm not sure" or "Well, I'll pick."

If the data field is binary one, zero, one, zero, zero, a sequential branch operation is started. As a result, the tape is stopped and a five-second choice period is initiated to wait for the child's input in response to the choices presented to it. If the binary field is binary one, zero, one, one, zero, this marks the end of the first response in a sequential branch. If the data field is all binary ones, this indicates no operation is to be performed.

As can be ascertained from the description above, there are any number of branching sequences that can be performed with respect to the tape mechanism. The branching segments may have two forms. The first form is referred to as a track branch. The second form is referred to as a sequential branch.

Proceeding on the assumption that the input device is a voice recognition unit, we have assumed there are a maximum of three words which can be stored in the recognition memory for comparison. Each word is chosen so as to be as phonetically different as possible. These three words are used for the choice of the branch. There are two additional conditions which affect the branching as well. They are (1) an unrecognizable word; and (2) no response whatsoever. In order to accommodate these responses, two prephrases are included in the branch sequence. Examples are (1) "I think you said" and (2) "I think I'll say." If a keyed input is used, the same two additional conditions exist: the child may key in an unrecognizable response, or not respond.

FIG. 18 illustrates the track branching format. Track branching is utilized when the responses of the talking toy are lengthy. There is little delay from the response of the child to the beginning of the audio of the selected track. If the voice recognition circuit has a good match, the prephrases "I'm not sure" 225 and "Well, I'll pick" 227 are skipped by fast-forwarding to the end of the prephase. In the case of a keyed-in response, a single comparison circuit (not shown) may be utilized.

Assuming the program is the track 2 program 223, and that a question is being posed, after it is posed, the tape stops and initiates the response. As a result of initiation of the response sequence, depending on the response given, whether it is response 1, response 2 or response 3, branching will occur accordingly. Assuming that the response is recognized by the processor as being response 1, the branching will go from the second track to the first track 229. If it is recognized as response 2, the program will go from the second track to the second track 231. If it is response 3, the program will go from the second track 223 to the third track 233.

If the responses are unintelligible or not conclusive, then either one of the prephrases "I'm not sure" or "Well, I'll pick" may be utilized. From there, the program can branch from either one of those choices. The program can branch to any one of the tracks 229, 231 or 233.

Figure 20:
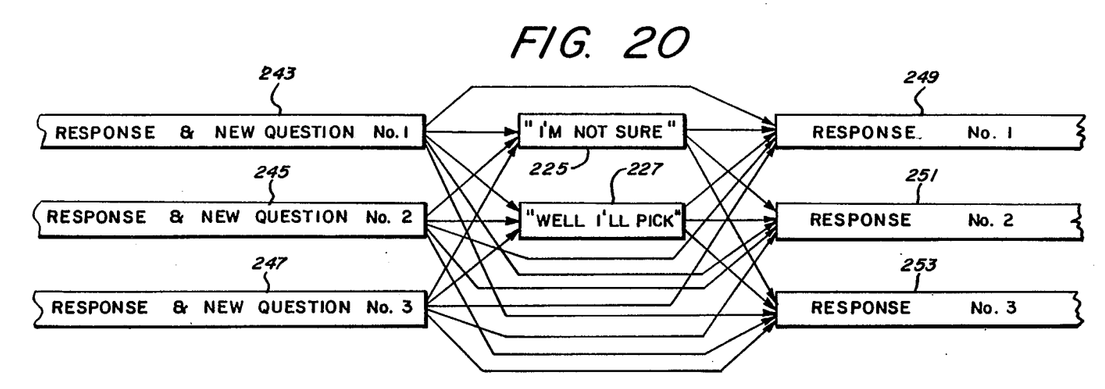
FIG. 20 illustrates a variety of branching sequences that may be implemented by the processor of the system.

The end of a track branch can take any number of forms. FIGS. 19 and 20 illustrate these endings. It is important to note that all recorded segments have approximately the same length to avoid delays. In the preferred embodiment, the worst case delay will be one-half of the difference in length plus one second. FIG. 19 shows a forced return. In this mode, all branches return to a single track so that regardless of which response, 1, 2 or 3, on the first track 229, second track 231 or third track 233, was provided, the next question is chosen from the second track segment 241.

FIG. 20 shows a branch return. As the figure illustrates, there are 45 possible combinations. As shown in the Figure, besides giving a response, the program segment provides a new question on the first track 243, the same with the program on the second track 245 and the third track 247. Any one of the responses 1, 2 or 3 on track 1 (249), track 2 (251), and track 3 (253) segments may be selected depending upon the input from the child, by selecting one of the responses. In case of no response or an inconclusive match, the prephrases "I'm not sure" 225 and "Well, I'll pick" 227 are selected first.

Figure 21:
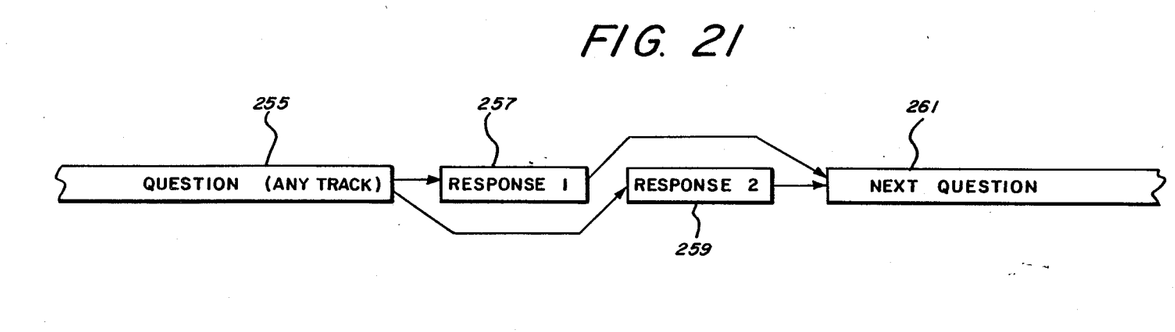
FIG. 21 illustrates a sequential branch scheme that may be implemented by the processor of the system.

FIG. 21 illustrates a sequential branch. The sequential branch is very useful when a response of the talking toy is short. The main limitations, as can be seen from FIG. 21, is that there may be a delay in reaching the response. This delay is proportional to the length of the response which is skipped. The delay in the preferred embodiment is between one-half and one-third of the normal play time from the end of the question to the correct response. The sequential branch is limited in this embodiment to one of two responses, as illustrated in FIG. 21, response 1 (257) or response 2 (259).

The major use of this type of branch is that it can be inserted within a track branch, as illustrated in FIG. 18. Thus, for example, a question posed by the talking toy on any track 255 initiates a response sequence which will provide response 1 (257) or response 2 (259) depending upon the child's input. The program then continues on the same track 261 but a different segment.

At the end of the tape, a standard ending is provided. This ending preferably includes instructions to wait for a minute or two (for the tape to rewind) while Jill (the name of the talking toy) rests. An example would be:
"Well, that's the end of my story. If you would like to start over, give me a few minutes to rest. When I stop moving, pull my cassette back and then push it back in, and I'll start from the very beginning."

The unit will then rewind. The unit will turn off after the tape is rewound.

What is claimed is:

1. An animated talking toy having movable body parts, the improvement therein comprising:
   a storage means for storing a plurality of diverse audio programs in different segments of the storage means;
   control data in the storage medium associated with each audio program;
   an audio input means for a human to input one of a preselected group of audio responses;
   a processor means responsive to the audio input means for selecting a particular audio program segment and its associated control data;
   audio output means responsive to the chosen program segment selected by said processor for playing the audio program; and
   means for controlling the movement of said movable body parts in response to the associated selected data.

2. The improved animated talking toy of claim 1 wherein said input means comprises a microphone and a word recognition means;
   said word recognition means consists of analog electronics for performing zero crossing detection, analog-to-digital conversion, and digital processing for performing spectral analysis to detect phonemes for each verbal input.

3. The improved animated talking toy of claim 1 wherein said input means comprises a microphone and a word recognition means.

4. The improved animated talking toy of claim 2 wherein the program materials are recorded on a plurality of tracks on the tape medium and the control data is recorded on one track of the tape medium.

5. The improved animated talking toy of claim 2 wherein the processor selects which particular track of the tape medium to be reproduced under control of said processor input means, the signals from the tape medium being supplied to a speaker.

6. The improved animated talking toy of claim 2 wherein the signals on the data track of the tape medium are recorded as analog signals, and including means for converting them to digital signals prior to transmission to the processor.

7. The improved animated talking toy of claim 1 wherein the data track signals transmitted to the processor direct the processor as to what moving parts of the doll are to be activated and how much.

8. The improved animated talking toy of claim 1 wherein said controlling means comprises a plurality of motors, one for each moving body part on the toy, wherein said processor directs a particular moving part to turn for a certain period of time in a certain direction.

9. The improved animated talking toy of claim 8 wherein the talking toy is a doll having a moving head, a moving left arm, a moving right arm, and a moving mouth, each moving independently of the other.

10. The improved animated talking toy of claim 8 wherein said processor continually moves each one of the moving body parts as directed by the signals in the data track.

11. The improved animated talking toy of claim 8 wherein said processor interrupts said sequential moving of the movable body parts upon being advised to expect a signal from the input means representative of a human input.

12. The improved animated talking toy of claim 11 wherein said processor stops the tape mechanism to wait for the signal from the input means.

13. The improved animated talking toy, of claim 12 wherein said processor selects a certain audio track for reproduction based on the signal received from the input means.

14. The improved animated talking toy of claim 2 wherein said processor selects a predetermined phrase for reproduction upon failing to receive a signal from the input means for a predetermined period of time.

15. The improved animated talking toy of claim 14 wherein said processor determines whether battery power is low upon the toy being activated.

16. The improved animated talking toy of claim 15 reproducing a first introductory audio program if the battery power is low and a second introductory audio program if the battery power is not low.

17. The improved animated talking toy of claim 6 wherein the analog signals on the data track are sine waves, a sine wave having a frequency of S1 representing a first binary state, and a sine wave having a frequency of S2 representing a second binary state.

18. The improved animated talking toy of claim 17 wherein the converting means includes a zero crossing detector.

19. The improved animated talking toy of claim 1 further comprising a gravity switch positioned to detect the toy in a reclining position, said switch deactivating the head and arm moving mechanism upon detecting the toy in a reclining position.

* * * * *